US010358553B2

(12) United States Patent
Jung et al.

(10) Patent No.: US 10,358,553 B2
(45) Date of Patent: Jul. 23, 2019

(54) RESIN COMPOSITION EXHIBITING GOOD HEAT RESISTANCE AND INSULATION PROPERTIES, AND PRODUCT USING SAME

(71) Applicant: Lotte Advanced Materials Co., Ltd., Yeosu-si (KR)

(72) Inventors: HyukJin Jung, Uiwang-si (KR); Myeonghwan Kim, Uiwang-si (KR); Seungshik Shin, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 33 days.

(21) Appl. No.: 15/833,335

(22) Filed: Dec. 6, 2017

(65) Prior Publication Data

US 2018/0187003 A1    Jul. 5, 2018

(30) Foreign Application Priority Data

Dec. 30, 2016    (KR) .................. 10-2016-0184153

(51) Int. Cl.
| | |
|---|---|
| *C08F 257/02* | (2006.01) |
| *C08L 69/00* | (2006.01) |
| *C08L 55/02* | (2006.01) |
| *C08L 51/04* | (2006.01) |
| *C08L 27/12* | (2006.01) |
| *C08K 5/00* | (2006.01) |
| *C08K 5/521* | (2006.01) |
| *C08F 279/04* | (2006.01) |
| *C08F 279/06* | (2006.01) |
| *C08K 3/00* | (2018.01) |
| *C08K 5/523* | (2006.01) |

(52) U.S. Cl.
CPC ............ *C08L 69/00* (2013.01); *C08F 257/02* (2013.01); *C08F 279/04* (2013.01); *C08F 279/06* (2013.01); *C08K 3/00* (2013.01); *C08K 5/00* (2013.01); *C08K 5/0066* (2013.01); *C08K 5/521* (2013.01); *C08K 5/523* (2013.01); *C08L 27/12* (2013.01); *C08L 51/04* (2013.01); *C08L 55/02* (2013.01); *C08F 2800/20* (2013.01); *C08L 2201/02* (2013.01); *C08L 2205/03* (2013.01); *C08L 2666/84* (2013.01)

(58) Field of Classification Search
USPC ........................................................ 524/115
See application file for complete search history.

(56) References Cited

U.S. PATENT DOCUMENTS

| | | | |
|---|---|---|---|
| 6,780,917 B2 | 8/2004 | Hashimoto et al. | |
| 7,271,212 B2 | 9/2007 | Oguni et al. | |
| 7,498,370 B2 | 3/2009 | Lim et al. | |
| 9,534,115 B2 | 1/2017 | Nii | |
| 2004/0249027 A1 | 12/2004 | Lim et al. | |
| 2005/0245648 A1 | 11/2005 | Lim et al. | |
| 2007/0249765 A1 | 10/2007 | Broman et al. | |
| 2015/0322260 A1 | 11/2015 | Chin et al. | |

FOREIGN PATENT DOCUMENTS

| | | |
|---|---|---|
| JP | 2004-002750 A | 1/2004 |
| JP | 3779623 B2 | 5/2006 |
| JP | 4469149 B2 | 5/2010 |
| JP | 5040224 B2 | 10/2012 |
| JP | 5360259 B2 | 12/2013 |
| KR | 10-2003-0048191 A | 6/2003 |
| KR | 10-2004-0004959 A | 1/2004 |
| KR | 10-2004-0058809 A | 7/2004 |
| KR | 10-2003-0047384 A | 8/2004 |
| WO | 2003-022928 A1 | 3/2003 |
| WO | 2003-089442 A1 | 10/2003 |
| WO | 2004-007611 A1 | 1/2004 |
| WO | 2004-016691 A1 | 2/2004 |
| WO | 2006-070982 A1 | 7/2006 |

OTHER PUBLICATIONS

Search Report in counterpart European Application No. 17206945.2 dated Jun. 22, 2018, pp. 1-7.

*Primary Examiner* — Terressa Boykin
(74) *Attorney, Agent, or Firm* — Addition, Higgins & Pendleton, P.A.

(57) ABSTRACT

A resin composition that can exhibit good heat resistance and/or insulation properties includes (A) a polycarbonate resin, (B) a vinyl-based copolymer, (C) a fluorinated polyolefin and (D) a phosphorus-based flame retardant represented by Chemical Formula 1:

[Chemical Formula 1]

$$R_6-O-\underset{\underset{R_7}{\overset{\overset{O}{\|}}{\text{P}}}}{\overset{}{}}-O-\left[R_8-O-\underset{\underset{R_9}{\overset{\overset{O}{\|}}{\text{P}}}}{\overset{}{}}-O\right]_n-R_{10}$$

wherein, in Chemical Formula 1, $R_6$, $R_7$, $R_9$ and $R_{10}$ are the same or different and are each independently a C6 to C20 aryl group or C1 to C14 alkyl-substituted C6 to C20 aryl group, $R_8$ is biphenyl, and n is an integer ranging from 1 to 5.

12 Claims, No Drawings

RESIN COMPOSITION EXHIBITING GOOD HEAT RESISTANCE AND INSULATION PROPERTIES, AND PRODUCT USING SAME

CROSS-REFERENCE TO RELATED APPLICATION

This application claims priority to and the benefit of Korean Patent Application No. 10-2016-0184153 filed in the Korean Intellectual Property Office on Dec. 30, 2016, the entire disclosure of which is incorporated herein by reference.

FIELD

The present disclosure relates to a resin composition that can exhibit excellent heat resistance and/or insulation properties and an article manufactured using the same.

BACKGROUND

A polycarbonate resin is an engineering plastic having excellent mechanical strength, high heat resistance, transparency, and the like, and therefore may be used in various fields such as office automation devices, electric/electronic parts, architectural materials, and the like.

In particular, polycarbonate resin used for electric/electronic housing parts should have excellent insulation properties and heat resistance as well as high flame retardancy and impact resistance.

In general, in order to improve the flame retardancy of the polycarbonate resin, a bisphenol A phosphoric acid ester-based flame retardant and the like may be used. While the flame retardancy may be improved, the heat resistance and insulation properties may be sharply deteriorated.

Accordingly, there is a need for a new resin composition having improved insulation properties and heat resistance as well as excellent flame retardancy and impact resistance.

SUMMARY

Exemplary embodiments provide a resin composition that can have improved insulation properties and/or heat resistance as well as improved flame retardancy and/or impact resistance.

Other exemplary embodiments provide an article manufactured from the resin composition.

A resin composition that can exhibit excellent heat resistance and/or insulation properties can include (A) a polycarbonate resin, (B) a vinyl-based copolymer, (C) a fluorinated polyolefin, and (D) a phosphorus-based flame retardant represented by the following Chemical Formula 1:

[Chemical Formula 1]

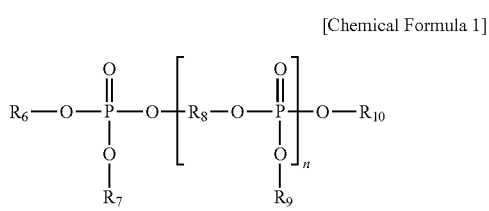

wherein, in Chemical Formula 1, $R_6$, $R_7$, $R_9$, and $R_{10}$ are the same or different and are each independently a C6 to C20 aryl group and/or alkyl-substituted C6 to C20 aryl group, $R_8$ is biphenyl, and n is an integer ranging from 1 to 5.

The phosphorus-based flame retardant (D) represented by Chemical Formula 1 may be biphenyl-4,4'-diyl tetraphenyl bis(phosphate).

The resin composition that can exhibit good heat resistance and/or insulation properties may include about 65 wt % to about 94 wt % of the polycarbonate resin (A), about 1 wt % to about 20 wt % of the vinyl-based copolymer (B), about 0.01 wt % to about 2 wt % of the fluorinated polyolefin (C), and about 1.5 wt % to about 15 wt % of the phosphorus-based flame retardant (D) represented by Chemical Formula 1, each based on a total amount (total weight, 100 wt %) of (A)+(B)+(C)+(D) of the resin composition.

The polycarbonate resin may include (A-1) a first polycarbonate resin and (A-2) a second polycarbonate resin having a different weight average molecular weight.

A weight average molecular weight of the first polycarbonate resin (A-1) may range from about 25,000 g/mol to about 32,000 g/mol and a weight average molecular weight of the second polycarbonate resin (A-2) may range from about 20,000 g/mol to about 25,000 g/mol.

The polycarbonate resin may include about 25 wt % to about 65 wt % of the first polycarbonate resin (A-1) and about 35 wt % to about 75 wt % of the second polycarbonate resin (A-2), each based on 100 wt % of the polycarbonate resin.

The vinyl-based copolymer may include at least one of (B-1) a rubber modified vinyl-based graft copolymer, (B-2) a rubber modified vinyl-based graft copolymer grafted with a (meth)acrylic acid ester compound and/or (B-3) an aromatic vinyl compound-vinyl cyanide compound copolymer.

The rubber modified vinyl-based graft copolymer may be an acrylonitrile-butadiene-styrene graft copolymer (g-ABS).

The rubber modified vinyl-based graft copolymer grafted with a (meth)acrylic acid ester compound may be a methylmethacrylate-butadiene-styrene copolymer (MBS).

The aromatic vinyl compound-vinyl cyanide compound copolymer may be a styrene-acrylonitrile copolymer (SAN).

According to exemplary embodiments, an article made using resin composition that can exhibit good heat resistance and/or insulation properties is provided.

The article may have a comparative tracking index (CTI) of about 0 to about 2 measured according to ASTM D3638-12.

The resin composition and an article manufactured using the same may have improved insulation properties and/or heat resistance as well as improved flame retardancy and/or impact resistance.

DETAILED DESCRIPTION

The present invention will be described more fully hereinafter with reference to the accompanying drawing, in which exemplary embodiments of the present invention are shown. This invention may, however, be embodied in many different forms and should not be construed as limited to the exemplary embodiments set forth herein. These exemplary embodiments disclosed in this specification are provided so that this disclosure will satisfy applicable legal requirements.

As used herein, when a definition is not otherwise provided, "substituted" refers to replacement of at least one hydrogen of a compound with one or more of a C1 to C30 alkyl group; a C1 to C10 alkylsilyl group; a C3 to C30 cycloalkyl group; a C6 to C30 aryl group; a C2 to C30 heteroaryl group; a C1 to C10 alkoxy group; a fluoro group, a C1 to C10 trifluoroalkyl group such as a trifluoromethyl group; and/or a cyano group.

As used herein, when a definition is not otherwise provided, the term "hetero" refers to 1 to 3 heteroatoms selected from N, O, S, and/or P in place of at least one carbon atom of a compound and/or a substituent.

As used herein, when a definition is not otherwise provided, the term "alkyl group" refers to a "saturated alkyl group" without an alkene group or an alkyne group; or an "unsaturated alkyl group" including at least one of an alkene group and an alkyne group. The term "alkene group" refers to a substituent in which at least two carbon atoms are bound with at least one carbon-carbon double bond, and the term "alkynyl group" refers to a substituent in which at least two carbon atoms are bound with at least one carbon-carbon triple bond. The alkyl group may be a branched, linear, and/or cyclic alkyl group.

The alkyl group may be a C1 to C20 alkyl group, for example a C1 to C6 lower alkyl group, a C7 to C10 middle alkyl group, and/or a C11 to C20 higher alkyl group.

The term "aromatic" refers to a compound including a cyclic structure where all elements have p-orbitals which form conjugation. Examples thereof include aryl group and/or heteroaryl group.

The term "aryl group" refers to monocyclic and/or fused ring-containing polycyclic (i.e., rings sharing adjacent pairs of carbon atoms) groups.

The term "heteroaryl group" refers to an aryl compound and/or substituent including 1 to 3 heteroatoms selected from N, O, S, and/or P in place of at least one carbon atom. When the heteroaryl group is a fused ring, each ring may include 1 to 3 heteroatoms.

As used herein, when a specific definition is not otherwise provided, the term "(meth)acrylate" refers to acrylate and/or methacrylate. In addition, the term "(meth)acrylic acid alkyl ester" refers to an acrylic acid alkyl ester and/or a methacrylic acid alkyl ester and the term "(meth)acrylic acid ester" refers to an acrylic acid ester and/or a methacrylic acid ester.

As used herein, when a definition is not otherwise provided, the term "copolymerization" refers to block copolymerization, random copolymerization, graft copolymerization, and/or alternate copolymerization and the term "a copolymer" refers to a block copolymer, a random copolymer, a graft copolymer, and/or an alternate copolymer.

In exemplary embodiments, a resin composition that can exhibit good heat resistance and/or insulation properties includes (A) a polycarbonate resin, (B) a vinyl-based copolymer, (C) a fluorinated polyolefin, and (D) a phosphorus-based flame retardant represented by Chemical Formula 1:

[Chemical Formula 1]

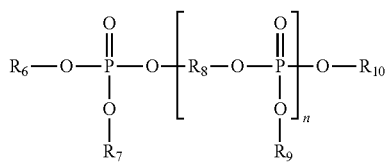

wherein, in Chemical Formula 1, $R_6$, $R_7$, $R_9$, and $R_{10}$ are the same or different and each are independently a C6 to C20 aryl group and/or alkyl-substituted C6 to C20 aryl group, $R_8$ is biphenyl, and n is an integer ranging from 1 to 5.

Hereinafter, each component of the resin composition that can exhibit good heat resistance and/or insulation properties is described.

(A) Polycarbonate Resin

In exemplary embodiments, the polycarbonate resin is a polyester having a carbonate bond, is not particularly limited, and may be any polycarbonate that is usable in a field of a resin composition.

For example, the polycarbonate resin may be prepared by reacting one or more diphenol(s) represented by Chemical Formula 2 with phosgene, halogenic acid ester, carbonate ester, and/or a combination thereof:

[Chemical Formula 2]

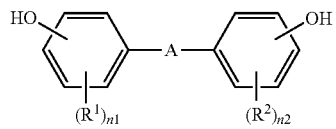

In Chemical Formula 2,

A is a linking group selected from a single bond, a substituted or unsubstituted C1 to C30 alkylene group, a substituted or unsubstituted C2 to C5 alkenylene group, a substituted or unsubstituted C2 to C5 alkylidene group, a substituted or unsubstituted C1 to C30 haloalkylene group, a substituted or unsubstituted C5 to C6 cycloalkylene group, a substituted or unsubstituted C5 to C6 cycloalkenylene group, a substituted or unsubstituted C5 to C10 cycloalkylidene group, a substituted or unsubstituted C6 to C30 arylene group, a substituted or unsubstituted C1 to C20 alkoxylene group, a halogenic acid ester group, a carbonate ester group, CO, S, and $SO_2$, $R^1$ and $R^2$ are the same or different and are each independently a substituted or unsubstituted C1 to C30 alkyl group and/or a substituted or unsubstituted C6 to C30 aryl group, and n1 and n2 are the same or different and are each independently an integer ranging from 0 to 4.

Two or more kinds of the diphenols represented by Chemical Formula 2 may be combined to constitute a repeating unit of a polycarbonate resin.

Examples of the diphenols may include without limitation hydroquinone, resorcinol, 4,4'-dihydroxydiphenyl, 2,2-bis (4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl) propane, bis(4-hydroxyphenyl)sulfoxide, bis(4-hydroxyphenyl)ketone, bis(4-hydroxyphenyl)ether, and the like, and mixtures thereof. For example, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, and/or 1,1-bis (4-hydroxyphenyl)cyclohexane may be used, for example, 2,2-bis(4-hydroxyphenyl)propane may be used.

The polycarbonate resin may be a copolymer and/or a mixture of copolymers obtained using two or more dipenols that differ from each other.

In addition, the polycarbonate resin may be a linear polycarbonate resin, a branched polycarbonate resin, a polyestercarbonate copolymer resin, and the like, and/or a mixture thereof.

The linear polycarbonate resin may include a bisphenol-A polycarbonate resin. The branched polycarbonate resin may include a polymer prepared by reacting a multi-functional aromatic compound such as trimellitic anhydride, trimellitic acid, and the like with diphenol(s) and a carbonate. The polyester carbonate copolymer resin may be prepared by reacting bifunctional carboxylic acid with diphenol(s) and carbonate, wherein the carbonate can be for example diaryl carbonate such as diphenyl carbonate and/or ethylene carbonate.

The resin composition may include the polycarbonate resin in an amount of about 65 wt % to about 94 wt %, for example about 70 wt % to about 93 wt %, based on a total amount (total weight, 100wt %) of (A)+(B)+(C)+(D) of the resin composition that can exhibit good heat resistance and/or insulation properties. In some embodiments, the resin composition may include the polycarbonate resin in an amount of about 65, 66, 67, 68, 69, 70, 71, 72, 73, 74, 75, 76, 77, 78, 79, 80, 81, 82, 83, 84, 85, 86, 87, 88, 89, 90, 91, 92, 93, or 94 wt %. Further, according to some embodiments, the amount of the polycarbonate resin may be in a range from about any of the foregoing amounts to about any other of the foregoing amounts.

When the amount of the polycarbonate resin is less than about 65 wt %, appearance characteristics, mechanical strength and/or heat resistance characteristics can be unfavorable. When the amount of the polycarbonate resin is greater than about 94 wt %, fluidity may be reduced.

Herein, the polycarbonate resin may include (A-1) a first polycarbonate resin and (A-2) a second polycarbonate resin, wherein the first polycarbonate resin (A-1) and the second polycarbonate resin (A-2) have a different weight average molecular weight from one another.

The first polycarbonate resin (A-1) may have a weight average molecular weight from about 25,000 g/mol to about 32,000 g/mol and the second polycarbonate resin (A-2) may have a weight average molecular weight from about 20,000 g/mol to about 25,000 g/mol, so long as the first polycarbonate resin (A-1) and the second polycarbonate resin (A-2) have different weight average molecular weights from one another.

The polycarbonate resin may include about 25 wt % to about 65 wt % of the first polycarbonate resin (A-1) and about 35 wt % to about 75 wt % of the second polycarbonate resin (A-2), each based on 100 wt % of the polycarbonate resin.

In some embodiments, the polycarbonate resin may include the first polycarbonate resin (A-1) in an amount of about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 wt %. Further, according to some embodiments, the amount of the first polycarbonate resin (A-1) may be in a range from about any of the foregoing amounts to about any other of the foregoing amounts.

In some embodiments, the polycarbonate resin may include the second polycarbonate resin (A-2) in an amount of about 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 wt %. Further, according to some embodiments, the amount of the second polycarbonate resin (A-2) may be in a range from about any of the foregoing amounts to about any other of the foregoing amounts.

When the weight average molecular weights and amounts of the first and second polycarbonate resins are within the above ranges respectively, the resin composition may have excellent impact resistance. In addition, the polycarbonate resin may have desirable fluidity by mixing the first and second polycarbonates having the above different weight average molecular weights.

(B) Vinyl-Based Copolymer

The resin composition that can exhibit good heat resistance and/or insulation properties may include a vinyl-based copolymer. The vinyl-based copolymer may improve impact resistance of the resin composition. Examples of the vinyl-based copolymer may include without limitation at least one of a rubber modified vinyl-based graft copolymer, a rubber modified aromatic vinyl-based copolymer grafted with (meth)acrylic acid ester compound (which is not the same as the rubber modified vinyl-based graft copolymer), and/or an aromatic vinyl compound-vinyl cyanide compound copolymer.

The resin composition may include the vinyl-based copolymer in an amount of about 1 wt % to about 20 wt %, for example about 3 wt % to about 15 wt %, based on a total amount (total weight, 100 wt %) of (A)+(B)+(C)+(D) of the resin composition. In some embodiments, the resin composition may include the vinyl-based copolymer in an amount of about 1, 2, 3, 4, 5, 6, 7, 8, 9, 10, 11, 12, 13, 14, 15, 16, 17, 18, 19, or 20 wt %. Further, according to some embodiments, the amount of the vinyl-based copolymer may be in a range from about any of the foregoing amounts to about any other of the foregoing amounts.

When the amount of the vinyl-based copolymer is greater than or equal to about 1 wt %, improved impact resistance may be ensured. When the amount of the vinyl-based copolymer is less than or equal to about 20 wt %, flame retardancy and/or thermal stability may be ensured.

Such a vinyl-based copolymer may be used alone or in a mixture of two or more.

Hereinafter, examples of the vinyl-based copolymer are described.

(B-1) Rubber Modified Vinyl-based Graft Copolymer

The rubber modified vinyl-based graft copolymer (B-1) includes a rubbery polymer grafted with an aromatic vinyl-based monomer and a monomer copolymerizable with the aromatic vinyl-based monomer.

Examples of the rubbery polymer include without limitation butadiene rubbers, styrene/butadiene rubbers, acrylonitrile/butadiene rubbers, isoprene rubbers, ethylene/propylene rubbers, ethylene-propylene-diene terpolymer (EPDM) rubbers, polyorganosiloxane/polyalkyl(meth)acrylate rubbers, and the like, and mixtures thereof.

The rubber modified vinyl-based graft copolymer may include the rubbery polymer in an amount of about 5 wt % to about 65 wt %, for example about 10 wt % to about 60 about wt %, and as another example about 20 wt % to about 50 wt %, based on the total weight (100 wt %) of the rubber modified vinyl-based graft copolymer. In some embodiments, the rubber modified vinyl-based graft copolymer may include the rubbery polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 wt %. Further, according to some embodiments, the amount of the rubbery polymer may be in a range from about any of the foregoing amounts to about any other of the foregoing amounts.

When the rubbery polymer is present in an amount within the above range, the resin composition may have improved impact resistance, mechanical properties and the like.

The rubbery polymer may have an average particle diameter of about 0.1 μm to about 10 μm in order to improve impact resistance and/or surface characteristics of an article using the same. For example, the average particle diameter of the rubbery polymer may range from about 0.15 µm to about 6 µm, as another example about 0.15 µm to about 4 µm, and as another example about 0.25 µm to about 3.5 µm. Within the ranges, the resin composition may ensure excellent impact strength. Average particle diameter can be measured by TEM (Transmission Electron Microscopy) as known in the art and the meaning of the average particle diameter is well understood by the skilled artisan.

The aromatic vinyl-based monomer may be graft-copolymerized on the rubbery copolymer. Examples of the aromatic vinyl-based monomer can include without limitation styrene, styrene substituted with a C1 to C10 alkyl group, halogen substituted styrene, and the like, and combinations thereof. For example, the aromatic vinyl-based monomer may include o-ethyl styrene, m-ethyl styrene, p-ethyl styrene, α-methyl styrene, and the like, but is not limited thereto, and may be used alone or in a mixture of two or more.

The rubber modified vinyl-based graft copolymer (B-1) may include the aromatic vinyl-based monomer in an amount of about 15 wt % to about 94 wt %, for example about 20 wt % to about 80 wt %, and as another example about 30 wt % to about 60 wt %, based on a total weight (100 wt %) of the rubber modified vinyl-based graft copolymer (B-1). In some embodiments, the rubber modified vinyl-based graft copolymer (B-1) may include the aromatic vinyl-based monomer in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, or 94 wt %. Further, according to some embodiments, the amount of the aromatic vinyl-based monomer may be in a range from about any of the foregoing amounts to about any other of the foregoing amounts.

When the aromatic vinyl-based monomer is present in an amount within the above range, impact resistance, mechanical properties, and the like may be improved.

Examples of the monomer copolymerizable with the aromatic vinyl-based monomer may include without limitation vinyl cyanide-based monomers such as acrylonitrile, methacrylonitrile, ethacrylonitrile, phenylacrylonitrile, α-chloroacrylonitrile, fumaronitrile, and the like. The monomer copolymerizable with the aromatic vinyl-based monomer may be used alone or in a mixture of two or more.

The rubber modified vinyl-based graft copolymer (B-1) may include the monomer copolymerizable with the aromatic vinyl-based monomer in an amount of about 1 wt % to about 20 wt %, for example about 5 wt % to about 15 wt %, based on a total weight (100 wt %) of the rubber modified vinyl-based graft copolymer (B-1). In some embodiments, the rubber modified vinyl-based graft copolymer (B-1) may include the monomer copolymerizable with the aromatic vinyl-based monomer in an amount of about 1, 2, 3, 4, 5, 6, 7, 8, 9, 10, 11, 12, 13, 14, 15, 16, 17, 18, 19, or 20 wt %. Further, according to some embodiments, the amount of the monomer copolymerizable with the aromatic vinyl-based monomer may be in a range from about any of the foregoing amounts to about any other of the foregoing amounts.

When the monomer copolymerizable with the aromatic vinyl-based monomer, such as a vinyl cyanide-based monomer, is included in an amount within the above ranges, excellent impact resistance and/or heat resistance may be obtained.

The rubber modified vinyl-based graft copolymer may be prepared by emulsion polymerization, suspension polymerization, bulk polymerization, and/or a combination thereof.

The rubber modified vinyl-based graft copolymer prepared by the above method may be for example an acrylonitrile-butadiene-styrene (ABS) graft copolymer.

The resin composition may include the rubber modified vinyl-based graft copolymer (B-1) in an amount of about 1 wt % to about 6 wt %, for example about 2 wt % to about 5 wt %, based on a total amount (total weight, 100 wt %) of (A)+(B)+(C)+(D) of the resin composition. In some embodiments, the resin composition may include the rubber modified vinyl-based graft copolymer (B-1) in an amount of about 1, 2, 3, 4, 5, or 6 wt %. Further, according to some embodiments, the amount of the rubber modified vinyl-based graft copolymer (B-1) may be in a range from about any of the foregoing amounts to about any other of the foregoing amounts.

The resin composition including the rubber modified vinyl-based graft copolymer (B-1) in an amount within the above ranges can exhibit excellent impact resistance and/or heat resistance.

(B-2) Rubber Modified Vinyl-Based Graft Copolymer Grafted with (Meth)Acrylic Acid Ester Compound The rubber modified vinyl-based graft copolymer grafted with a (meth)acrylic acid ester compound (B-2), which is not the same as the rubber modified vinyl-based graft copolymer (B-1), may be a core-shell type copolymer wherein the core is a rubbery polymer and the shell is a copolymer of an aromatic vinyl-based compound and a (meth)acrylic acid ester compound.

The rubber modified vinyl-based graft copolymer grafted with a (meth)acrylic acid ester compound (B-2) may be prepared using any polymerization method known in the related art without any particular limit, for example, mass polymerization, suspension polymerization, emulsion polymerization, and the like.

For example, the (B-2) copolymer may be prepared by graft-polymerizing about 40 wt % to about 60 wt % of a mixture of an aromatic vinyl-based compound and a (meth)acrylic acid ester compound with about 40 wt % to about 60 wt % of a rubbery polymer using an emulsion polymerization method.

In some embodiments, the mixture of an aromatic vinyl-based compound and a (meth)acrylic acid ester compound may be present in an amount of about 40, 41, 42, 43, 44, 45, 46, 47, 48, 49, 50, 51, 52, 53, 54, 55, 56, 57, 58, 59, or 60 wt %. Further, according to some embodiments, the amount of the mixture of an aromatic vinyl-based compound and a (meth)acrylic acid ester compound may be in a range from about any of the foregoing amounts to about any other of the foregoing amounts.

In some embodiments, the rubbery polymer may be present in an amount of about 40, 41, 42, 43, 44, 45, 46, 47, 48, 49, 50, 51, 52, 53, 54, 55, 56, 57, 58, 59, or 60 wt %. Further, according to some embodiments, the amount of the rubbery polymer may be in a range from about any of the foregoing amounts to about any other of the foregoing amounts.

When the mixture includes the rubbery polymer, the aromatic vinyl-based compound, and the (meth)acrylic acid ester compound in an amount within the above ranges, the resin composition may have excellent impact resistance, heat resistance, and the like.

Herein, the rubbery polymer may form a core layer. The rubbery polymer may have an average particle diameter ranging from about 200 nm to about 400 nm. Average particle diameter can be measured by TEM (Transmission Electron Microscopy) as known in the art and the meaning of the average particle diameter is well understood by the skilled artisan.

When the rubbery polymer has an average particle diameter of less than about 200 nm, impact resistant characteristics may be deteriorated. When the rubbery polymer has an average particle diameter of greater than about 400 nm, workability may be deteriorated.

Examples of the rubbery polymer may include without limitation one or a mixture of two or more selected from polybutadiene rubbers, acryl-based rubbers, ethylene/propylene rubbers, styrene/butadiene rubbers, acrylonitrile/butadiene rubbers, polyisoprene rubbers, ethylene-propylene-diene terpolymer (EPDM) rubbers, polyorganosiloxane/polyalkyl(meth)acrylate rubber composites, the like, and mixtures thereof. In exemplary embodiments, the polybutadiene rubber may be used.

Examples of the aromatic vinyl-based compound that forms the shell may include without limitation one or more selected from styrene, C1-C10 alkyl substituted styrene, halogen substituted styrene, vinyl toluene, vinyl naphthalene, and the like, and mixtures thereof. Examples of the alkyl substituted styrene may include without limitation α-methyl styrene, p-methyl styrene, o-ethyl styrene, m-ethyl styrene, p-ethyl styrene, p-t-butyl styrene, 2,4-dimethyl styrene, and the like, and mixtures thereof. In exemplary embodiments, the aromatic vinyl-based compound may include styrene.

Examples of the (meth)acrylic acid ester compound may include without limitation C1 to C10 alkyl methacrylic acid esters and/or C1 to C10 alkyl acrylic acid esters. In exemplary embodiments, the (meth)acrylic acid ester compound may include polymethylmethacrylate (PMMA).

In exemplary embodiments, the rubber modified vinyl-based graft copolymer grafted with a (meth)acrylic acid ester compound (B-2) can have a shell layer formed of a methylmethacrylate-styrene copolymer.

Herein, the shell layer can include about 70 wt % to about 83 wt % of methylmethacrylate and about 17 wt % to about 30 wt % of styrene, each based on the total amount (total weight percent, 100 wt %) of the methylmethacrylate-styrene copolymer.

In some embodiments, the shell layer may include methylmethacrylate in an amount of about 70, 71, 72, 73, 74, 75, 76, 77, 78, 79, 80, 81, 82, or 83 wt %. Further, according to some embodiments, the amount of methylmethacrylate may be in a range from about any of the foregoing amounts to about any other of the foregoing amounts.

In some embodiments, the shell layer may include styrene in an amount of about 17, 18, 19, 20, 21, 22, 23, 24, 25, 26, 27, 28, 29, or 30 wt %. Further, according to some embodiments, the amount of styrene may be in a range from about any of the foregoing amounts to about any other of the foregoing amounts.

In exemplary embodiments, the rubber modified vinyl-based graft copolymer grafted with a (meth)acrylic acid ester compound (B-2) may include methylmethacrylate-butadiene-styrene copolymer (MBS).

The resin composition may include the rubber modified vinyl-based graft copolymer grafted with a (meth)acrylic acid ester compound (B-2) in an amount of about 1 wt % to about 15 wt %, for example about 2 wt % to about 13 wt %, and as another example about 3 wt % to about 10 wt %, based on the total weight (100 wt %) of (A)+(B)+(C)+(D) of the resin composition. In some embodiments, the resin composition may include the rubber modified vinyl-based graft copolymer grafted with a (meth)acrylic acid ester compound (B-2) in an amount of about 1, 2, 3, 4, 5, 6, 7, 8, 9, 10, 11, 12, 13, 14, or 15 wt %. Further, according to some embodiments, the amount of the rubber modified vinyl-based graft copolymer grafted with a (meth)acrylic acid ester compound (B-2) may be in a range from about any of the foregoing amounts to about any other of the foregoing amounts.

The resin composition including the rubber modified vinyl-based graft copolymer grafted with a (meth)acrylic acid ester compound (B-2) in an amount within the above ranges may exhibit improved impact resistance and/or heat resistance.

(B-3) Aromatic Vinyl Compound-Vinyl Cyanide Compound Copolymer

The aromatic vinyl compound-vinyl cyanide compound copolymer (B-3) is formed by copolymerization of a vinyl cyanide compound and an aromatic vinyl compound.

Examples of the vinyl cyanide compound may include without limitation acrylonitrile, methacrylonitrile, fumaronitrile, and the like, and mixtures thereof.

Examples of the aromatic vinyl compound may include without limitation styrene, α-methyl styrene, halogen substituted styrene, C1 to C10 alkyl group substituted styrene, and the like, and mixtures thereof.

In exemplary embodiments, the vinyl cyanide compound-aromatic vinyl compound copolymer may include a styrene-acrylonitrile (SAN) copolymer.

The aromatic vinyl compound-vinyl cyanide compound copolymer resin may have a weight average molecular weight of about 60,000 g/mol to about 350,000 g/mol, for example about 70,000 g/mol to about 180,000 g/mol.

The resin composition may include the aromatic vinyl compound-vinyl cyanide compound copolymer resin (B-3) in an amount of about 1 wt % to about 12 wt %, for example about 2 wt % to about 7 wt %, based on the total weight (100 wt %) of (A)+(B)+(C)+(D) of the resin composition. In some embodiments, the resin composition may include the aromatic vinyl compound-vinyl cyanide compound copolymer resin (B-3) in an amount of about 1, 2, 3, 4, 5, 6, 7, 8, 9, 10, 11, or 12 wt %. Further, according to some embodiments, the amount of the aromatic vinyl compound-vinyl cyanide compound copolymer resin (B-3) may be in a range from about any of the foregoing amounts to about any other of the foregoing amounts.

When the aromatic vinyl compound-vinyl cyanide compound copolymer is included in an amount outside of the above ranges, compatibility with the polycarbonate resin may be deteriorated, and thus heat resistance may be deteriorated.

(C) Fluorinated Polyolefin

Examples of the fluorinated polyolefin (C) may include without limitation polytetrafluoroethylene resins, polyfluoroethylene resins, polyfluoropropylene resins, polyfluorobutylene resins, polyvinylidene fluoride, tetrafluoroethylene/vinylidene fluoride copolymers, tetrafluoroethylene/hexafluoropropylene copolymers, ethylene/tetrafluoroethylene copolymers, and the like. These may be used individually or as a mixture of two or more thereof.

The resin composition may include the fluorinated polyolefin (C) in an amount of about 0.01 wt % to about 2 wt %, for example about 0.1 wt % to about 1.5 wt %, based on a total amount (total weight, 100 wt %) of (A)+(B)+(C)+(D) of the resin composition. In some embodiments, the resin composition may include the fluorinated polyolefin (C) in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, or 2 wt %. Further, according to some embodiments, the amount of the fluorinated polyolefin (C) may be in a range from about any of the foregoing amounts to about any other of the foregoing amounts.

When the fluorinated polyolefin is present in an amount within the above ranges, a resin composition having improved flame retardancy and/or impact resistance may be obtained.

(D) Phosphorus-Based Flame Retardant

In exemplary embodiments, the phosphorus-based flame retardant (D) may be represented by the following Chemical Formula 1:

[Chemical Formula 1]

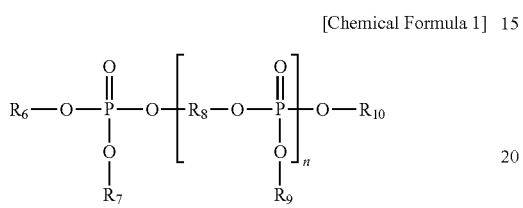

wherein, in Chemical Formula 1, $R_6$, $R_7$, $R_9$, and $R_{10}$ are the same or different and are each independently a C6 to C20 aryl group or alkyl-substituted C6 to C20 aryl group, $R_8$ is biphenyl, and n is an integer ranging from 1 to 5.

As used in Chemical Formula 1, the alkyl substituent of the alkyl-substituted aryl group may be a C1 to C14 alkyl group.

In exemplary embodiments, the phosphorus-based flame retardant represented by Chemical Formula 1 may be represented by the following Chemical Formula 1-1:

[Chemical Formula 1-1]

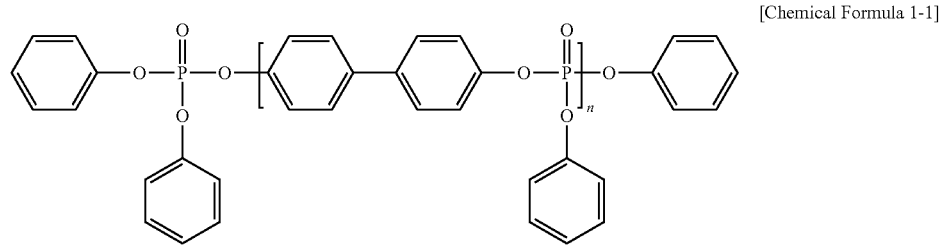

wherein, in Chemical Formula 1-1, n is 1 to 4.

For example, the phosphorus-based flame retardant represented by Chemical Formula 1 may include biphenyl-4,4'-diyl tetraphenyl bis(phosphate).

The phosphorus-based flame retardant represented by Chemical Formula 1 may be present as a mixture of oligomers.

The phosphorus-based flame retardant (D) may be mixed with one or more of another phosphorus-containing flame retardant, for example, phosphonates, phosphazenes, and the like, and mixtures thereof.

The resin composition may include the phosphorus-based flame retardant (D) represented by Chemical Formula 1 in an amount of about 1.5 wt % to about 15 wt %, for example about 2 wt % to about 13 wt %, based on a total amount (total weight, 100 wt %) of (A)+(B)+(C)+(D) of the resin composition. In some embodiments, the resin composition may include the phosphorus-based flame retardant (D) represented by Chemical Formula 1 in an amount of about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 wt %. Further, according to some embodiments, the amount of the phosphorus-based flame retardant (D) represented by Chemical Formula 1 may be in a range from about any of the foregoing amounts to about any other of the foregoing amounts.

When the phosphorus-based flame retardant represented by Chemical Formula 1 is included in an amount within the above ranges, the resin composition may exhibit improved flame retardancy with minimal or no deterioration of other properties.

(E) Additive(s)

The resin composition may optionally further include one or more additives according to its use. Examples of the additive may include without limitation antioxidants, release agents, lubricants, plasticizers, heat stabilizers, light stabilizers, colorants, and the like, and two or more may be mixed according to characteristics of final articles.

The antioxidant may suppress and/or block a chemical reaction of the above resin composition with oxygen and thus can prevent decomposition of the resin composition and loss of its inherent properties. Examples of the antioxidants include without limitation at least one of phenol-type, phosphate-type, thioether-type, and/or amine-type antioxidants. In exemplary embodiments, the antioxidant may include a first antioxidant and a second antioxidant.

The release agent can improve formability and/or stability of the resin composition. Examples of the release agent may include without limitation fluorine-containing polymers, silicone oils, metal salts of stearic acid, metal salts of montanic acid, montanic acid ester waxes, and/or polyethylene waxes.

The lubricant can lubricate the surface of a metal contacting a resin composition during a molding-extrusion process and thus can help flow and/or movement of the resin composition and may be a conventionally-used material.

The plasticizer is used to increase flexibility, process workability, and/or an expansion property of the resin composition and may be a conventionally-used material.

The heat stabilizer can suppress thermal decomposition of the resin composition when kneaded and/or molded at a high temperature and may be a conventionally-used material.

The light stabilizer can suppress and/or block decomposition of the resin composition when exposed to ultraviolet (UV) and can help minimize color change and/or mechanical property loss. Examples of the light stabilizer can include without limitation at least one of hindered phenol type, benzophenone type, and/or benzotriazole type light stabilizers.

The colorant may include a conventional pigment and/or dye.

The additive may be included in an amount of about 0.01 to about 15 parts by weight based on about 100 parts by weight of the resin composition.

The resin composition that can exhibit good heat resistance and/or insulation properties according to the present disclosure may be prepared using any conventional well-known method of preparing a resin composition. For example, a resin composition that can exhibit good heat resistance and/or insulation properties according to the present disclosure may be manufactured into pellets by mixing the components and other optional additives simultaneously and melt-kneading the same in an extruder.

An article according to one embodiment of the present disclosure may be formed of the aforementioned resin composition. The resin composition can exhibit excellent flame retardancy, insulation properties, and/or heat resistance as well as excellent impact resistance and/or fluidity.

The article may be manufactured in various conventional methods known in the related art, for example, injection molding, blow molding, extrusion, and the like using the resin composition. Examples of the article may include parts of various electric and/or electronic appliances, ejection molded products having complex shapes, and the like, but is not limited thereto.

The article can exhibit excellent insulation properties and/or flame retardancy. For example, the article may have a CTI (Comparative Tracking Index) of less than or equal to about 2 and be rated in a range of V-0 in an UL94 vertical flame retardant test.

In addition, the article may exhibit excellent impact resistance and/or heat resistance. For example, the article may exhibit a notch Izod impact strength ranging from about 60 kgf·cm/cm to about 90 kgf·cm/cm at a thickness of ⅛" measured according to ASTM D256. In addition, the article may have a melt flow index measured according to ASTM D 1238 in a range of about 25 to about 30 under a condition of 250° C./10 kg and in a range of about 10 to about 15 under a condition of 220° C./10 kg. Furthermore, the article may have a Vicat softening temperature measured according to ASTM D1525 in a range of about 110° C. to about 140° C.

In this way, the resin composition and an article formed thereof according to the present disclosure can exhibit improved heat resistance and/or insulation properties as well as excellent impact resistance and/or flame retardancy and thus may be usefully used for exteriors, parts, and the like of various electrical/electronic appliances requiring these characteristics.

EXAMPLES

Hereinafter, the present disclosure is illustrated in more detail with reference to the following examples and comparative examples. However, the following examples and comparative examples are provided for the purpose of illustration only and the present disclosure is not limited thereto.

The components used for preparing resin compositions in Examples and Comparative Examples are as follows:

(A) Polycarbonate Resin (A-1) Bisphenol-A type polycarbonate resin having a weight average molecular weight of 28,000 g/mol (manufacturer: Lotte Advanced Materials Co., Ltd., SC-1080)

(A-2) Bisphenol-A type polycarbonate resin having a weight average molecular weight of 23,000 g/mol (manufacturer: Lotte Advanced Materials Co., Ltd. SC-1190)

(B) Vinyl-Based Copolymer (B-1) g-ABS wherein 55 wt % of styrene and acrylonitrile (weight ratio: 75/25) are graft-copolymerized on 45 wt % of a butadiene rubber having a Z-average of 310 nm.

(B-2) Rubber modified vinyl-based graft copolymer grafted with a (meth)acrylic acid ester compound: methyl methacrylate-butadiene-styrene copolymer (MBS, manufacturer: Mitsubishi rayon, METABLEN C-223A)

(B-3) SAN resin wherein 82 wt % of styrene and 19 wt % of acrylonitrile are polymerized (weight average molecular weight: 130,000 g/mol).

(C) Fluorinated Polyolefin

Polytetrafluoroethylene resin (manufacturer: Pacific International, trade name: AD 001)

(Flame Retardant)

(D) Phosphorus-based flame retardant represented by Chemical Formula 1-1:

[Chemical Formula 1-1]

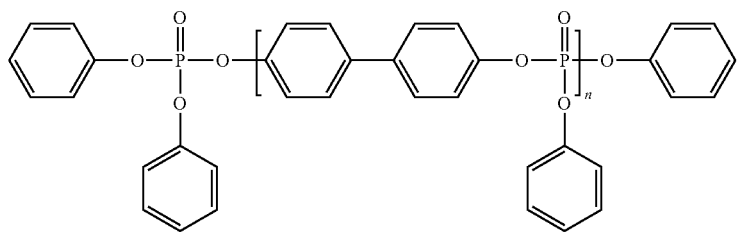

wherein, in the chemical formula, n is 1 to 4 (manufacturer: Adeca corporation, trade name: FP900, biphenyl-4,4'-diyl tetraphenyl bis(phosphate))

(1) Flame Retardant 1: bisphenol A diphenylphosphate (manufacturer: Daihachi Chemical Industry Co., Ltd., trade name: CR741)

(2) Flame Retardant 2: resorcinol diphenyl phosphate, (manufacturer: Daihachi Chemical Industry Co., Ltd., trade name: CR733S)

(3) Flame Retardant 3: potassium diphenyl sulfone sulfonate, (manufacturer: Arichem, trade name: KSS)

(4) Flame Retardant 4: potassium perfluorobutane sulfonate (manufacturer: 3M, trade name: FR-2025)

Examples 1 to 4, Comparative Examples 1 to 5, and Reference Example 1

The components are used to prepare each resin composition according to Examples 1 to 4, Comparative Examples 1 to 5, and Reference Example 1 to respectively have the compositions shown in Table 1. According to the manufacturing method, each component is mixed to have the compositions shown in Table 1 and then, extruded with a 45π twin-screw extruder and manufactured into pellets. Herein, the extrusion is performed at 260° C. and RPM of 250 and produced 80 kg/hr of the pellets. The manufactured pellets are injection-molded into specimens by setting a 120 ton injector at an injection temperature of 260° C. and a molding temperature of 60° C.

TABLE 1

|   |   | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 | Ref. Ex. 1 |
|---|---|---|---|---|---|---|---|---|---|---|---|
| PC | (A-1) | 37 | 37 | 57 | 57 | 37 | 37 | 37 | 57 | 57 | 37 |
|    | (A-2) | 55.5 | 55.5 | 20.4 | 20.4 | 55.5 | 55.5 | 55.5 | 20.4 | 20.4 | 55.5 |
| (B-1) g-ABS | | 4 | — | 5 | — | 4 | — | — | 5 | 5 | 4 |
| (B-2) MBS | | — | 4 | — | 5 | — | 4 | 4 | — | — | — |
| (B-3) SAN | | — | — | 6 | 6 | — | — | — | 6 | 6 | — |
| (C) PTFE | | 0.6 | 0.6 | 1 | 1 | 0.6 | 0.6 | 0.6 | 1 | 1 | 0.6 |
| Flame retardant | (D) FP900 | 2.3 | 2.3 | 10 | 10 | — | — | — | — | — | 20 |
|  | Flame retardant 1 | — | — | — | — | 2.3 | — | — | 10 | — | — |
|  | Flame retardant 2 | — | — | — | — | — | — | — | — | 10 | — |
|  | Flame retardant 3 | — | — | — | — | — | 0.3 | — | — | — | — |
|  | Flame retardant 4 | — | — | — | — | — | — | 0.1 | — | — | — |
| First antioxidant | | 0.1 | 0.1 | 0.1 | 0.1 | 0.1 | 0.1 | 0.1 | 0.1 | 0.1 | 0.1 |
| Second antioxidant | | 0.1 | 0.1 | 0.1 | 0.1 | 0.1 | 0.1 | 0.1 | 0.1 | 0.1 | 0.1 |
| Release agent | | 0.4 | 0.4 | 0.4 | 0.4 | 0.4 | 0.4 | 0.4 | 0.4 | 0.4 | 0.4 |

(unit: wt %)

Evaluation

Properties of the specimens manufactured in Examples 1 to 4 and Comparative Examples 1 to 5, and Reference Example 1 are evaluated, and the results are shown in Table 3.

(1) Izod impact strength (kgf·cm/cm): measured by equipping ⅛"-thick and 3.2 mm-long Izod specimens with a notch according to an evaluation method of ASTM D256.

(2) Melt Flow Index (MI): measured under each condition of 250° C./10 kg or 220° C./10 kg according to an evaluation method of ASTM D 1238.

(3) Vicat Softening Temperature: measured according to ASTM D1525 and under a temperature-increasing condition of 5 kgf and 50° C./hr according to ISO 306/1350.

(4) Flame Retardancy: measured by manufacturing specimens having a size of 125 (w)×12.5 (L)×1.5 (H) mm according to a UL-94 vertical test.

(5) BPT (Ball Pressure Test): performed to measure numerical stability under a stress at a high temperature by passing 3.0 mm specimens through 125° C. according to KS C2006-1998, and herein, passing the test is showing excellent numerical stability.

Specifically, when a deep-caved hole having a diameter of less than 2 mm is formed by applying a steel ball having a diameter of 5 mm to the specimens heated up to 125° C. with a static load of 20±4N, 'pass' is given.

(6) CTI (Comparative Tracking Index): obtained by measuring a voltage where 3.0 mm specimens are not carbonized by dropping a NH$_4$Cl aqueous solution having a concentration of 0.1 wt % one by one up to 50 drops by every 30 second on the surface of the specimens according to ASTM D3638-12. CTI is evaluated according to the measured voltage with a reference to Table 2 and shown in Table 3. The lower the CTI is, the more excellent insulating characteristics are obtained.

TABLE 2

| Range tracking index (volts) | Assigned PLC |
|---|---|
| 600 ≤ TI | 0 |
| 400 ≤ TI < 600 | 1 |
| 250 ≤ TI < 400 | 2 |
| 175 ≤ TI < 250 | 3 |
| 100 ≤ TI < 175 | 4 |
| 0 ≤ TI < 100 | 5 |

TABLE 3

|   | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 | Ref. Ex. 1 |
|---|---|---|---|---|---|---|---|---|---|---|
| IZOD (kgf · cm/cm) | 75 | 80 | 60 | 65 | 65 | 70 | 70 | 60 | 45 | 21 |
| MI 250° C./10 kg | 29 | 27 | — | — | 29 | 12 | 12 | — | — | 65 |
| 220° C./10 kg | — | — | 12 | 11 | — | — | — | 14 | 16 | — |
| VST (° C.) | 137 | 137 | 115 | 115 | 134 | 141 | 141 | 108 | 105 | 85 |
| UL94 | V-0 | V-0 | V-0 | V-0 | V-1 | V-1 | V-1 | V-0 | V-0 | V-0 |
| BPT | pass | pass | pass | pass | pass | pass | pass | pass | fail | fail |
| CTI grade | 2 | 1 | 1 | 0 | 3 | 3 | 3 | 3 | 3 | 0 |

As shown in Table 3, the resin compositions including a flame retardant represented by Chemical Formula 1 according to Examples 1 to 4 exhibit excellent MI and also exhibit excellent heat resistance, impact strength, flame retardancy, and insulating characteristics. Particularly, high flame retardancy and high insulation properties are obtained.

In contrast, the resin compositions including bisphenol, resorcinol, and a sulfonic acid metal salt-based flame retardant according to Comparative Examples 1 to 5 exhibit deteriorated flame retardancy and impact resistance or deteriorated insulation properties despite excellent flame retardancy.

Also in contrast, a resin composition including the biphenol phosphorus-based flame retardant in an amount outside of the range of the present disclosure, that is, the resin composition according to Reference Example 1, exhibits excellent flame retardancy and insulation properties but remarkably-deteriorated impact strength and heat resistance characteristics.

The resin composition according to exemplary embodiments includes the biphenol phosphorus-based flame retardant represented by Chemical Formula 1 along with the polycarbonate resin, the vinyl-based copolymer, and the fluorinated polyolefin and thus may secure excellent flame retardancy and impact resistance and simultaneously, realize excellent heat resistance and insulation properties.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A resin composition with heat resistance and/or insulation properties, comprising:
   (A) a polycarbonate resin;
   (B) a vinyl-based copolymer;
   (C) a fluorinated polyolefin; and
   (D) a phosphorus-based flame retardant represented by Chemical Formula 1:

[Chemical Formula 1]

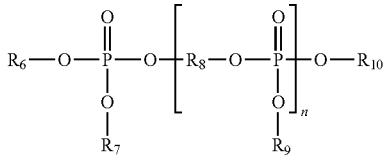

wherein, in Chemical Formula 1,
   $R_6$, $R_7$, $R_9$, and $R_{10}$ are the same or different and are each independently a C6 to C20 aryl group or C1 to C14 alkyl-substituted C6 to C20 aryl group,
   $R_8$ is biphenyl, and
   n is an integer ranging from 1 to 5.

2. The resin composition of claim 1, wherein the phosphorus-based flame retardant (D) represented by Chemical Formula 1 is biphenyl-4,4'-diyl tetraphenyl bis(phosphate).

3. The resin composition of claim 1, comprising:
   about 65 wt % to about 94 wt % of the polycarbonate resin (A);
   about 1 wt % to about 20 wt % of the vinyl-based copolymer (B);
   about 0.01 wt % to about 2 wt % of the fluorinated polyolefin (C); and
   about 1.5 wt % to about 15 wt % of the phosphorus-based flame retardant (D) represented by Chemical Formula 1, each based on the total weight of (A)+(B)+(C)+(D) of the resin composition.

4. The resin composition of claim 1, wherein the polycarbonate resin includes (A-1) a first polycarbonate resin and (A-2) a second polycarbonate resin having a different weight average molecular weight.

5. The resin composition of claim 4, wherein the first polycarbonate resin (A-1) has a weight average molecular weight of about 25,000 g/mol to about 32,000 g/mol, and
   the second polycarbonate resin (A-2) has a weight average molecular weight of about 20,000 g/mol to about 25,000 g/mol.

6. The resin composition of claim 4, wherein the polycarbonate resin includes about 25 wt % to about 65 wt % of the first polycarbonate resin (A-1), and about 35 wt % to about 75 wt % of the second polycarbonate resin (A-2), based on 100 wt % of the polycarbonate resin (A).

7. The resin composition of claim 1, wherein the vinyl-based copolymer includes at least one of (B-1) a rubber modified vinyl-based graft copolymer, (B-2) a rubber modified vinyl-based graft copolymer grafted with a (meth) acrylic acid ester compound, and/or (B-3) an aromatic vinyl compound-vinyl cyanide compound copolymer.

8. The resin composition of claim 7, wherein the rubber modified vinyl-based graft copolymer (B-1) is an acrylonitrile-butadiene-styrene graft copolymer (g-ABS).

9. The resin composition of claim 7, wherein the rubber modified vinyl-based graft copolymer grafted with a (meth) acrylic acid ester compound (B-2) is a methylmethacrylate-butadiene-styrene (MBS) copolymer.

10. The resin composition of claim 7, wherein the aromatic vinyl compound-vinyl cyanide compound copolymer (B-3) is a styrene-acrylonitrile (SAN) copolymer.

11. An article manufactured from the resin composition of claim 1.

12. The article of claim 11, wherein the article has a comparative tracking index (CTI) of about 0 to about 2 measured according to ASTM D3638-12.

* * * * *